United States Patent [19]

Bougamont et al.

[11] E Patent Number: Re. 33,552

[45] Reissued Date of Patent: Mar. 12, 1991

[54] DISPENSING VALVE

[75] Inventors: Jean-Louis Bougamont; Alain Behar, both of Eu, France

[73] Assignee: Societe Francaise d'Aerosol et de Bouchage, Courbevoie, France

[21] Appl. No.: 570,934

[22] Filed: Aug. 22, 1990

Related U.S. Patent Documents

Reissue of:

[64] Patent No.: 4,842,168
Issued: Jun. 27, 1989
Appl. No.: 79,184
Filed: Jul. 29, 1987

[30] Foreign Application Priority Data

Jul. 30, 1986 [FR] France ..... 86 11018

[51] Int. Cl.[5] ..... B65D 83/00

[52] U.S. Cl. ..... 222/402.16; 222/402.2; 141/20

[58] Field of Search ..... 222/402.16, 402.2; 141/20

[56] References Cited

U.S. PATENT DOCUMENTS

| | | | |
|---|---|---|---|
| 3,178,078 | 4/1965 | Wittke | 222/402 |
| 3,394,851 | 7/1968 | Gorman | 222/402.2 |
| 4,135,648 | 1/1979 | White | 222/402.2 |
| 4,271,875 | 6/1981 | Meshberg | 222/402.16 |
| 4,427,137 | 1/1984 | Dubini . | |

FOREIGN PATENT DOCUMENTS

| | | |
|---|---|---|
| 633493 | 12/1963 | Belgium . |
| 0125865 | 11/1984 | European Pat. Off. . |
| 1292114 | 6/1961 | France . |
| 2065176 | 6/1971 | France . |
| 2087355 | of 1882 | United Kingdom . |

*Primary Examiner*—H. Grant Skaggs
*Attorney, Agent, or Firm*—Pennie & Edmonds

[57] ABSTRACT

The invention relates to a dispensing valve comprising a body formed of a cylindrical casing of rigid material closed by a cover, in which two seals having fluid-tight joints create a lock chamber inside which moves an atomizer provided with a sliding distributor, guided at its ends, which a return spring placed upstream urges towards the cover. The valve has a sleeve allowing alteration of the volume of the chamber and a front seal formed as a separate member, both formed of semi-rigid plastic material. The seal is disposed immediately adjacent an abutment surface formed in the casing. The design is such that entry of liquid during filling takes place through an auxiilary duct and the front seal and sleeve may be formed as a single member if desired.

5 Claims, 2 Drawing Sheets

DISPENSING VALVE

Matter enclosed in heavy brackets [ ] appears in the original patent but forms no part of this reissue specification; matter printed in italics indicates the additions made by reissue.

BACKGROUND OF THE INVENTION

The invention relates to a dispensing valve, and more particularly an aerosol valve which allows delivery of a measured quantity of the aerosol product from a receptacle in which the product is confined.

Such valves are well known, they generally take the form of a double valve. Thus, they comprise a hollow body which is formed from a cylindrical casing of rigid material, closed by a cover which also allows the valve to be fixed to the receptacle and provided with an inlet orifice.

Two seals having fluid-tight joints create a lock chamber inside the valve. A distributor guided at its ends, travels through the center of the valve with a return spring which holds it towards the cover. Formed at the top end of the distributor is a control rod which extends through the cover allowing the distributor to be displaced by means of a head having a push button. The distributor has two series of channels, one set putting the chamber into communication with the liquid in the receptacle when the valve is in its rest position, or when it leaves this position allowing the chamber to be filled, the others opening to the exterior when the button is pressed to allow the contents to be dispensed by the internal pressure or by pumping.

The inlet orifice may have a filling tube if it is desired to use the valve in a higher position above the receptacle. On the other hand, the valve may be placed immediately upstream of the front seal if, to improve precision, it is preferred to use it in a lower position with the receptacle inverted.

Normally, the control rod has an axial discharge duct so that it forms a tube. The control rod and distributor together form an atomizer in which the tube allows the feeding of a spray nozzle mounted on the tube.

Each of the two fluid-tight joints which seal the lock chamber are generally simple sliding joints, flat or having a lip, in which the distributor may slide up and down. However, for the valve to be perfectly fluid-tight in the rest position it is necessary for the joint of the external or rear seal to be made of an elastomer, which may contact the distributor shoulder.

On the other hand, the joint of the internal or front seal does not normally serve any purpose except during operation, that is for a limited time. It does not therefore require such perfect fluid-tightness and as such is sometimes integral with the casing, despite the rigidity of the material used for making the latter.

However, even a small leak through the front seal affects the amount delivered and these valves are often used to deliver products, such as medicines, which are to be dispensed in very small, exact amounts. Moreover, the spring, a member which is not precisely made, may be advantageously placed in an admission chamber upstream of the front seal, rather than in the lock chamber. This configuration is expensive because it may require the presence of undercuts in the distributor to allow fluids to enter the lock chamber. Also, a second, removable joint of elastomer is then used, in spite of its inferior chemical behavior, to permit the seal to flex over the undercut portion.

Often the two seals are immobilised by means of a fluid-tight sleeve formed of a semi-rigid plastic material. The thickness of the sleeve may be varied to modify the internal volume of the lock chamber without the use of a complex and more expensive member.

In particular, FR 2494390 describes a valve with a lower joint of conical shape having a lip and states that the sleeve could be made integral therewith, but with the disadvantage that it is formed of the same, expensive material. While it is true that this allows the number of components to be reduced by one and simplifies mounting at a small increase in the cost of tooling, the advantages obtained do not outweigh the disadvantages mentioned above. Also, the precision of the valve may be adversely affected by use of an elastic sleeve.

In general, the valves in question are filled by intrusion or forced opening, that is the tube is mounted in place on a pump which injects the necessary amount of product in the liquid state, under high pressure. This opens at least one of the seals at the joints to provide a channel to allow the receptacle to fill. The dissymmetry in the joint structure may be utilized to facilitate opening of the seal when it is operated in reverse and subjected to large pressure differences.

Frequently, it is the front joint which is forced open, but if it is not elastic a special arrangement allows a rear joint to operate instead, at least when an auxiliary joint is not used.

SUMMARY OF THE INVENTION

According to the invention, and contrary to the teaching of the prior art, it is possible to obtain a fluid-tight front seal and joint using a semi-rigid plastic material identical or similar to that of the sleeve itself. In this invention the forced filling must then take place by another route, in particular through the rear joint.

Thus, all the disadvantages of the prior art valves may be avoided by providing on the casing, upstream of the front seal, a surface capable of acting as an abutment surface close to the distributor to prevent radial deformation of the front seal.

During filling, when a reverse pressure is exerted on the front seal, the abutment surface maintains the seal deformation below the elastic limit. This allows direct penetration of part of the liquid but prevents the volume of the lock chamber from being altered permanently and as a result the precision of the valve is not altered during filling. The seal forms a bearing for guiding the distributor which is therefore free from undercuts and thus from any lateral seam which would adversely affect the fluid-tightness. With this design the front seal and the sleeve may be effectively formed as a single member.

The invention combines efficiency and low cost as all the members are easy to make, and the majority of them may be made of inexpensive material.

DETAILED DESCRIPTION OF THE INVENTION

Figure 1:
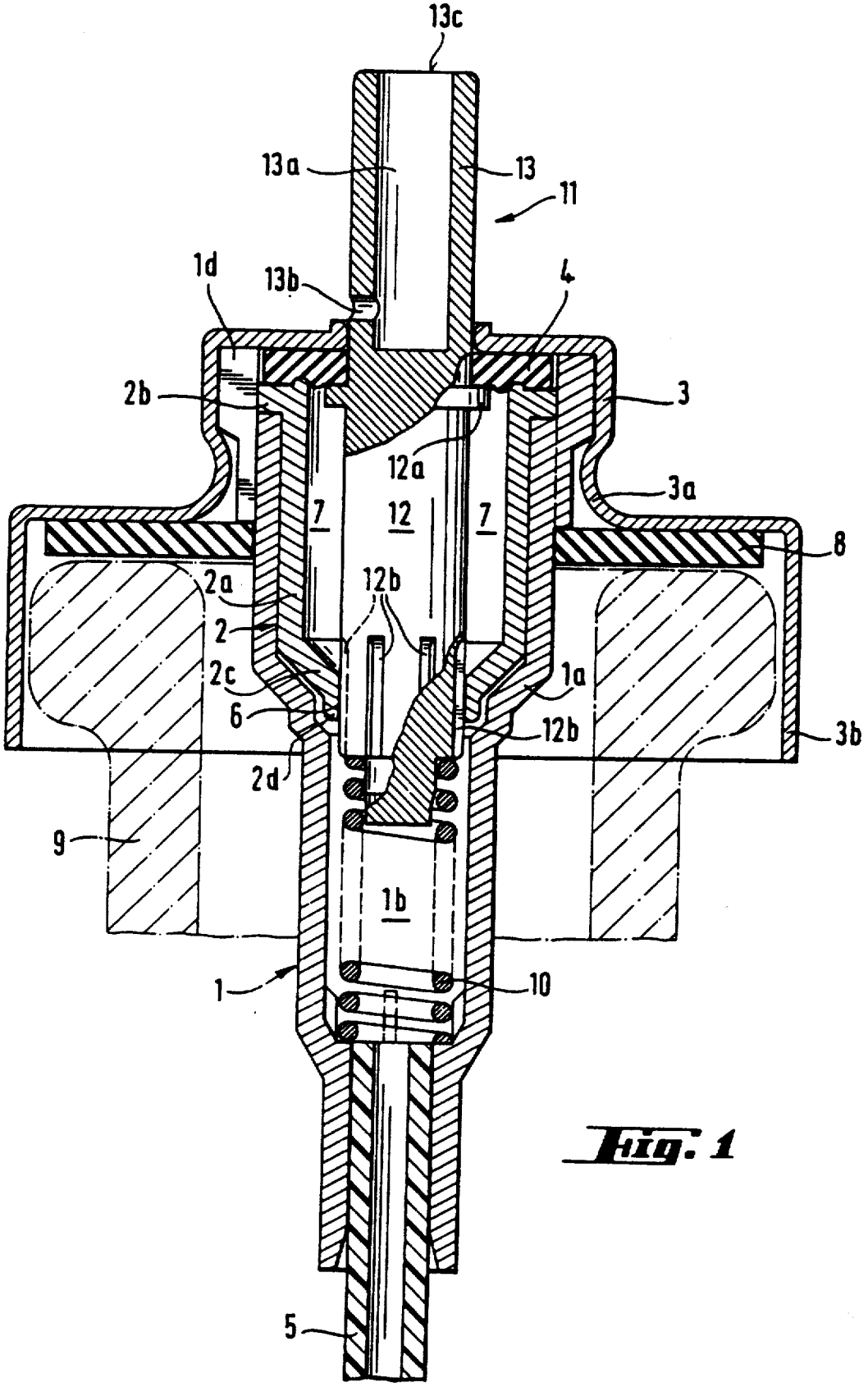
FIG. 1 shows a cross-section of a valve according to the invention in its rest position.

The body of the valve according to FIG. 1 is formed of a casing 1 having a sleeve 2 and is closed by a metal cover 3 enclosing an elastomeric joint 4.

The casing is made of a rigid resin, such as polyacetal. At its lower part, its wall has a conical abutment surface 1b forming without undercut a front chamber 1b carrying an intake tube 5.

The sleeve 2 is formed of a semi-rigid polyethylene. Its side wall 2a, provided with a flange 2b, extends at its lower part into a conical part 2c carrying a collar 2d to form a front seal 6. The sleeve 2 is fitted freely in the casing at a close tolerance, and its conical part 2c engages the abutment surface 1a.

The elastomeric joint 4 serves as a rear seal. The cover 3, fixed by crimping at 3a on the casing immobilises the rear seal together with the sleeve 2. The sleeve 2, engaged by its flange 2b in a mounting provided at the upper part of the casing 1, defines a lock chamber 7 and its skirt, carrying a fluid-tight joint 8, is engaged at 3b on the receptacle 9.

Inside the valve there are mounted a spring 10 and a cylindrical atomizer 11 acting also as a distributor, formed of polyacetal. The latter comprises a shell 12 extending through the joint 4 by a tubular rod 13 in which a central duct 13a opens at its lower part through a lateral orifice 13b to the outside of the valve, and at its axial outlet by an orifice 13c capable of feeding the spray nozzle or head at the end of a push-button stem (not shown). The shell 12 has a collar 12a of which the upper shoulder comes into fluid-tight contact with the joint 4. Grooves 12b form passages through seal 6, and the end of the shell 12 makes contact with spring 10. The shell 12 is of generally uniform diameter, without any undercuts in the area of the seal 6.

The front seal 6 also acts as a bearing for the shell of the distributor formed as above. When downward force is applied to the stem or tubular rod 13, the distributor first closes the front passage on the seal 6, enclosing in the chamber 7 a predetermined volume of the fluid, and then clears the orifice 13b, allowing this volume to escape under the effect of the vapor pressure of the carrying liquid.

When the operator releases the force applied to the head the passage open at the rear seal closes first, making the receptacle fluid-tight. Then the front passage is opened, allowing liquid to penetrate the lock chamber 7 under the effect of the reduced pressure which was created therein.

Figure 2:
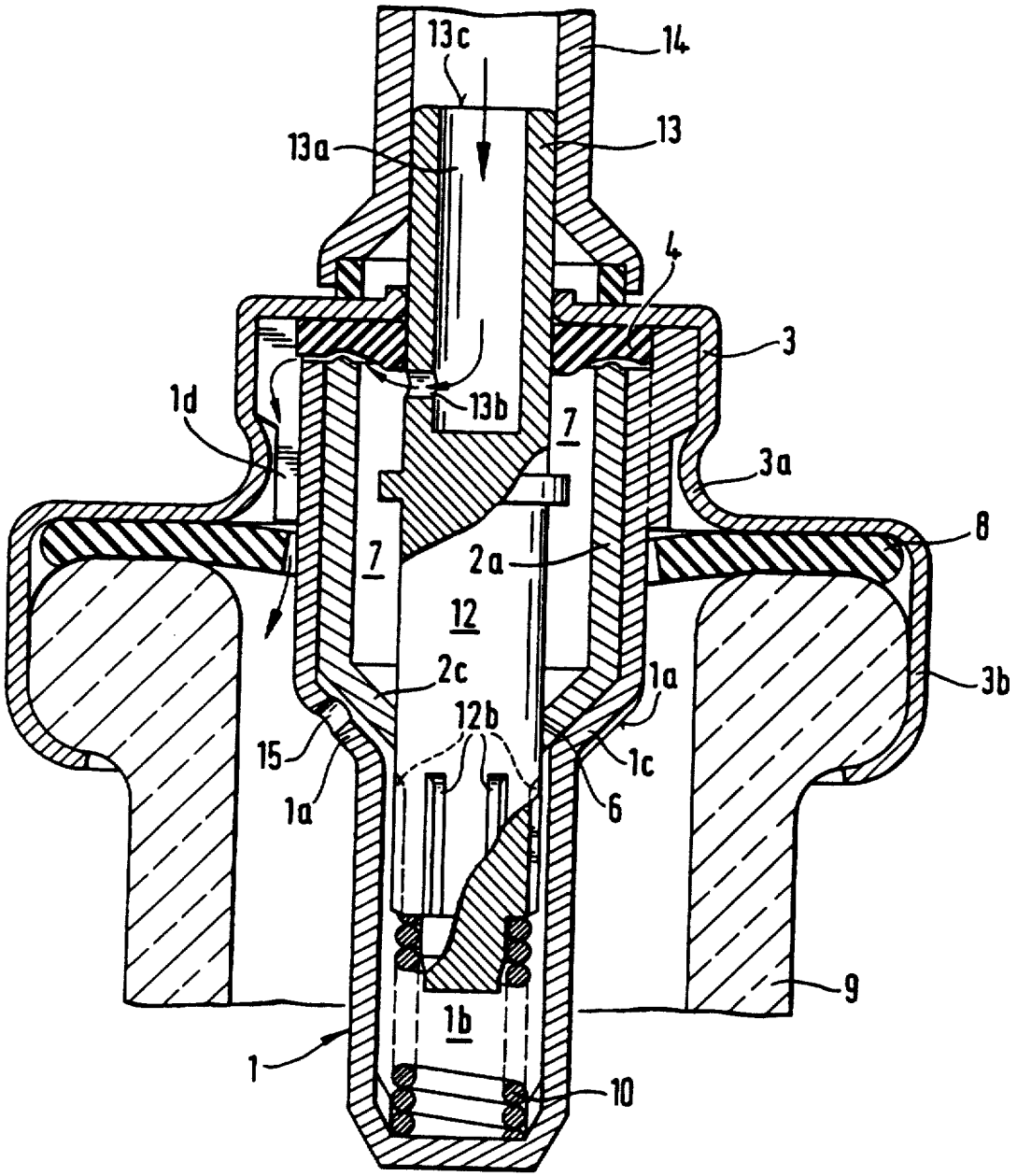
FIG. 2 shows a cross-section of a second embodiment of the valve according to the present invention with the atomizer pressed in, during the forced filling.

The valve of FIG. 2 is shown during refilling positioned on the outlet of a pump 14, with the atomizer pressed in. It is essentially similar to the valve of FIG. 1, its members therefore have the same reference numbers.

The principal difference is that it is intended for use with the head in a downward position, therefore it does not have a feed tube, but has at least one admission orifice 15 placed in the spring chamber 1b close to the lock chamber 7 of the valve. The side wall 2a of the sleeve used is thicker so that the volume of the lock chamber is less, and it does not have a flange, but is engaged throughout its length and can be made in two parts. The collar 2d is replaced by a simple oblique lip. To facilitate access of liquid from the orifices 15 the abutment surface 1a is formed of a number of ribs 1c in contact with the conical part 2c, but forming internal grooves. Ribs 1c allow movement of the edge of the lip, so that fluid-tightness can be obtained without tightening.

In both cases, located on the upper part of external surface of the wall of the casing 1 there is a bleeder 1d which opens to the side of joint 4, through a groove means, and on to the upper surface of the joint 8 for assembly on the receptacle. The wall of the casing is strengthened in this region.

For filling the valve is connected by its tube 13 to pump 14 which injects the liquid. In general, the pumping pressure has the effect of bringing the atomizer to a position identical to its spraying position, allowing liquid to enter by the tube 13 rather than along joint 4, but also closing the passage along the joint of the front seal 6. The increase of pressure in the chamber does not significantly deform the front seal 6, as the conical part 2c is in contact with the abutment surface 1a.

Under these conditions, the liquid may flow through the front seal 6 with difficulty, but by deforming joint 4 it moves in the direction of bleeder 1d to press the joint 8 towards the interior, which allows the liquid to penetrate rapidly in the direction of the arrows into the receptacle 9.

When filling has ceased, the chamber returns to its original volume, with the atomizer returning to its rest position; the valve is then ready for operation.

What is claimed:

1. In a metering and dispensing valve for a container of pressurized material, said valve comprising a body formed of a cylindrical casing of rigid material, a sleeve fitted inside of said casing, the top end of said casing having disposed thereon a cover defining an aperture through which an elongated atomizer member mounted for reciprocal movement in said aperture protrudes, a front seal creating a fluid-tight joint between said sleeve and said atomizer member, a rear seal creating a fluid-tight joint between said sleeve and said cover, said front and rear seals and said sleeve defining a lock chamber inside of which there is disposed said atomizer member provided with a sliding distributor guided at its ends, a return spring positioned below said distributor which operatively biases the distributor to return towards the cover, and the volume of the lock chamber being dependent on the internal dimensions of said sleeve, the improvement wherein:

(a) the sleeve and the front seal are formed of semi-rigid plastic material having an elastic limit;

(b) the casing forms an abutment surface immediately adjacent to and supporting the front seal such that deformation of the front seal is constrained by said abutment surface so as not to exceed the elastic limit of the front seal; and (c) a filling means is provided which allows liquid to enter by a route other than the front seal when a reverse pressure is applied during filling.

2. The dispensing valve according to claim 1, wherein the front seal is made as a single member with the sleeve.

3. The dispensing valve according to claims 1 or 2, wherein:

(a) the front seal forms a guiding bearing for the sliding of the distributor; and (b) the distributor is made with grooves which form passages through said front seal, said passages being of such lenght that they are disposed entirely below said front seal when said atomizer is in a position to dispense material, said distributor otherwise being of uniform diameter.

4. The dispensing valve according to claim 3, wherein the abutment surface of the casing is provided with ribs which are separated by grooves.

5. The dispensing valve according to claim 1, wherein the filing means comprises a bleeder located on an external wall surface of the casing which opens at the side of the rear seal to create a passageway to allow fluid to enter the container thereby providing an alternate to the front seal as a route for the filling of the container.

* * * * *